United States Patent
Zhang et al.

(10) Patent No.: US 9,532,083 B2
(45) Date of Patent: Dec. 27, 2016

(54) COOPERATIVE CACHING METHOD AND APPARATUS

(71) Applicant: Huawei Technologies Co., Ltd., Shenzhen, Guangdong (CN)

(72) Inventors: Hongbo Zhang, Shenzhen (CN); Guangyu Shi, Santa Clara, CA (US); Zhefeng Yan, Shenzhen (CN); Shueng-han gary Chan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 784 days.

(21) Appl. No.: 13/907,503

(22) Filed: May 31, 2013

(65) Prior Publication Data

US 2013/0263194 A1    Oct. 3, 2013

Related U.S. Application Data

(63) Continuation of application No. PCT/CN2011/083464, filed on Dec. 5, 2011.

(30) Foreign Application Priority Data

Dec. 3, 2010    (CN) .......................... 2010 1 0573221

(51) Int. Cl.
*H04N 7/173* (2011.01)
*H04N 7/16* (2011.01)
(Continued)

(52) U.S. Cl.
CPC .... *H04N 21/23106* (2013.01); *H04L 67/2842* (2013.01); *H04N 21/2225* (2013.01);
(Continued)

(58) Field of Classification Search
CPC H04N 21/2183; H04N 21/222; H04N 21/231; H04N 21/23106
See application file for complete search history.

(56) References Cited

U.S. PATENT DOCUMENTS

| | | |
|---|---|---|
| 6,463,508 B1 | 10/2002 | Wolf et al. |
| 2002/0007392 A1* | 1/2002 | Buddhikot ............. H04N 7/165 709/203 |

(Continued)

FOREIGN PATENT DOCUMENTS

| | | |
|---|---|---|
| CN | 101184021 A | 5/2008 |
| CN | 101551781 A | 10/2009 |

(Continued)

OTHER PUBLICATIONS

Ji Xu, et al., "A Cooperative Caching Algorithm for Multi-Cell Data Broadcasting", IEEE Communications Society, Jun. 20, 2004, p. 4072-4076.

(Continued)

*Primary Examiner* — Kyu Chae

(57) ABSTRACT

Embodiments of the present invention disclose a cooperative caching method and apparatus, relating to the field of network technologies, to improve the local hit ratio without increasing the local server costs. The technical solution provided in the present invention includes: obtaining, according to cache information, end-to-end delay between a local server and a neighbor server, and popularity in a cache list, a consolidated gain value of a cached video segment and a consolidated gain value of a candidate video segment in the local server; and replacing the cached video segment with the candidate video segment when the consolidated gain value of the cached video segment and the consolidated gain value of the candidate video segment in the local server meet a replacement condition.

18 Claims, 8 Drawing Sheets

(51) Int. Cl.
H04N 21/231 (2011.01)
H04N 21/2225 (2011.01)
H04N 21/237 (2011.01)
H04N 21/24 (2011.01)
H04L 29/08 (2006.01)

(52) U.S. Cl.
CPC ..... *H04N 21/237* (2013.01); *H04N 21/23116* (2013.01); *H04N 21/24* (2013.01)

(56) References Cited

U.S. PATENT DOCUMENTS

| | | | |
|---|---|---|---|
| 2002/0087797 A1* | 7/2002 | Adrangi | G06F 12/0888 711/133 |
| 2011/0179243 A1* | 7/2011 | Gardner | G06F 11/1443 711/162 |
| 2011/0231475 A1* | 9/2011 | Van der Merwe | H04L 29/12066 709/203 |

FOREIGN PATENT DOCUMENTS

| | | | |
|---|---|---|---|
| CN | 101764993 A | 6/2010 | |
| CN | 102075562 A | 5/2011 | |
| WO | WO 01/03373 A1 | 1/2001 | |

OTHER PUBLICATIONS

International Search Report dated Mar. 15, 2012 in connection with International Patent Application No. PCT/CN2011/083464.

* cited by examiner

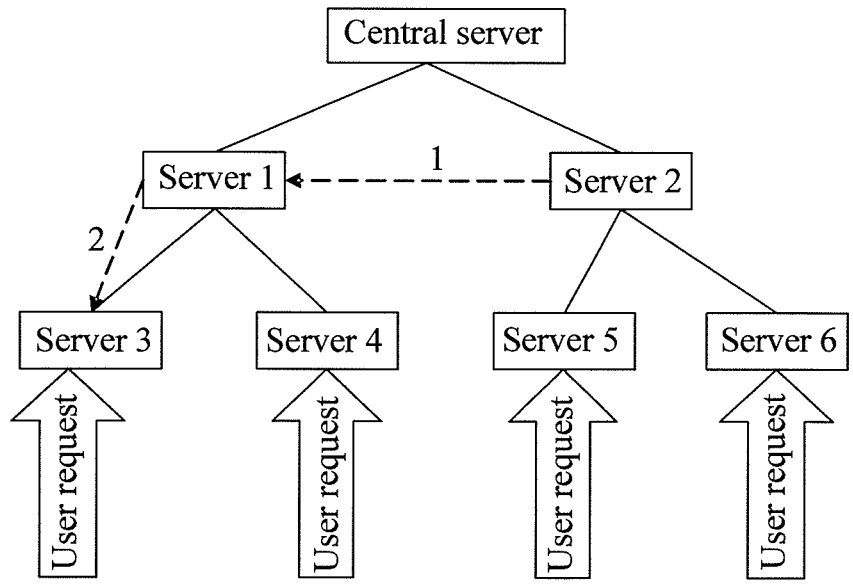

FIG. 1

Obtain, according to cache information, end-to-end delay between a local server and a neighbor server, and popularity of a video segment in a cache list, a consolidated gain value of a cached video segment and a consolidated gain value of a candidate video segment in the local server — 201

Replace the cached video segment with the candidate video segment when the consolidated gain value of the cached video segment and the consolidated gain value of the candidate video segment in the local server meet a replacement condition — 202

FIG. 2

COOPERATIVE CACHING METHOD AND APPARATUS

CROSS-REFERENCE TO RELATED APPLICATIONS

This application is a continuation of International Application No. PCT/CN2011/083464, filed on Dec. 5, 2011, which claims priority to Chinese Patent Application No. 201010573221.X, filed on Dec. 3, 2010, both of which are hereby incorporated by reference in their entireties.

TECHNICAL FIELD

The present invention relates to the field of network technologies, and in particular, to a cooperative caching method and apparatus.

BACKGROUND

In a video-on-demand (Video-on-Demand, VoD) system, one or multiple central servers generally store all video segments in which a user is interested. In addition, some local servers with limited storage capacity are deployed around a central server. Compared with the central server, these local servers are closer to the user side and may respond to a request of the user in time. When the user requests a certain video segment, the user first requests the content from a local server in the place where the user is located, (a) if the content required by the user exists on the local server, the local server directly responds to the request of the user, which is called a local hit; and (b) if the content required by the user does not exist on the local server, the local server may guide the request of the user to another local server or the central server that stores the content, and that server provides the content for the user, which is called a local hit failure.

Since the local server has limited storage capacity, it is capable of caching only part of the video segments. When each of the local servers is configured with a poor caching policy, a large number of local hit failures may be caused. In this case, the user needs to obtain the required video segment from another local server or the central server. This may generate a large amount of network traffic, which not only increases end-to-end delay between the server and the user, but also causes network congestion. Specifically, as shown in FIG. 1, the arrows in FIG. 1 indicate flow directions of currently requested data, and the digits above the arrows indicate overlay network path labels. In FIG. 1, a user under a server 3 needs to obtain a video segment from a server 2 because of a local hit failure. In this case, traffic is generated on network paths 1 and 2 shown in FIG. 1, and therefore additional network traffic is generated. In the case of a large number of local hit failures, a large amount of network traffic may be generated.

In the prior art, the problem of an increase of the end-to-end delay between the server and the user and the network congestion occurring because a large number of local hit failures on the local server cause a large amount of network traffic is mainly solved by increasing the storage capacity of the local server, so that the local server is capable of caching more video segments, thereby implementing network capacity expansion and reducing the local hit failure ratio on the local server.

However, how to improve the local hit ratio without increasing the local server costs is a problem to be solved urgently.

SUMMARY

Embodiments of the present invention provide a cooperative caching method and apparatus, to improve the local hit ratio without increasing the local server costs.

An embodiment of the present invention provides a cooperative caching method, including: obtaining, according to cache information, end-to-end delay between a local server and a neighbor server, and popularity of a video segment in a cache list, a consolidated gain value of a cached video segment and a consolidated gain value of a candidate video segment in the local server, where the cache information includes an identifier of a video segment and information about a server that stores the video segment, and the information about the server includes an identifier of the server; and replacing the cached video segment with the candidate video segment when the consolidated gain value of the cached video segment and the consolidated gain value of the candidate video segment in the local server meet a replacement condition.

An embodiment of the present invention further provides a cooperative caching apparatus, including:

a calculating unit, configured to obtain, according to cache information, end-to-end delay between a local server and a neighbor server, and popularity of a video segment in a cache list, a consolidated gain value of a cached video segment and a consolidated gain value of a candidate video segment in the local server, where the cache information includes an identifier of a video segment and information about a server that stores the video segment, and the information about the server includes an identifier of the server; and a replacing unit, configured to replace the cached video segment with the candidate video segment when the consolidated gain value of the cached video segment and the consolidated gain value of the candidate video segment in the local server that are calculated and obtained by the calculating unit meet a replacement condition.

According to the cooperative caching method and apparatus provided in the embodiments of the present invention, whether the cached video segment needs to be replaced with the candidate video segment is determined by judging whether the consolidated gain value of the cached video segment and the consolidated gain value of the candidate video segment in the local server that are obtained according to the cache information, the end-to-end delay, and the popularity meet the replacement condition. When the consolidated gain value of the cached video segment and the consolidated gain value of the candidate video segment in the local server meet the replacement condition, the cached video segment is replaced with the candidate video segment, which is capable of improving the local hit ratio of a local user without increasing the local server costs.

BRIEF DESCRIPTION OF THE DRAWINGS

FIG. 1 is a diagram of network architecture in the prior art;

FIG. 2 is a flow chart of a cooperative caching method according to an embodiment of the present invention;

DETAILED DESCRIPTION

Embodiments of the present invention provide a cooperative caching method and apparatus, to improve the local hit ratio without increasing the local server costs.

As shown in FIG. 2, an embodiment of the present invention provides a cooperative caching method, including:

Step 201: Obtain, according to cache information, end-to-end delay between a local server and a neighbor server, and popularity of a video segment in a cache list, a consolidated gain value of a cached video segment and a consolidated gain value of a candidate video segment in the local server.

In this embodiment, the cache list includes the cache information, the end-to-end delay between the local server and the neighbor server, and the popularity of the video segment, the cache information includes an identifier of a video segment and information about a server that stores the video segment, and the information about the server includes an identifier of the server.

Step 202: Replace the cached video segment with the candidate video segment when the consolidated gain value of the cached video segment and the consolidated gain value of the candidate video segment in the local server meet a replacement condition.

In this embodiment, the replacement condition may be that the consolidated gain value of the candidate video segment is greater than that of the cached video segment, and may preferably be that a sum of the consolidated gain value of the candidate video segment and that of the cached video segment is greater than a preset threshold. The replacement condition is not limited to the preceding two types. No further description is provided here.

According to the cooperative caching method provided in this embodiment, whether the cached video segment needs to be replaced with the candidate video segment is determined by judging whether the consolidated gain value of the cached video segment and the consolidated gain value of the candidate video segment in the local server that are obtained according to the cache information, the end-to-end delay, and the popularity meet the replacement condition. When the consolidated gain value of the cached video segment and the consolidated gain value of the candidate video segment in the local server meet the replacement condition, the cached video segment is replaced with the candidate video segment, which is capable of improving the local hit ratio of a local user without increasing the local server costs.

To make a person skilled in the art better understand the technical method provided in this embodiment, the following describes the cooperative caching method provided in this embodiment in detail.

Figure 3:
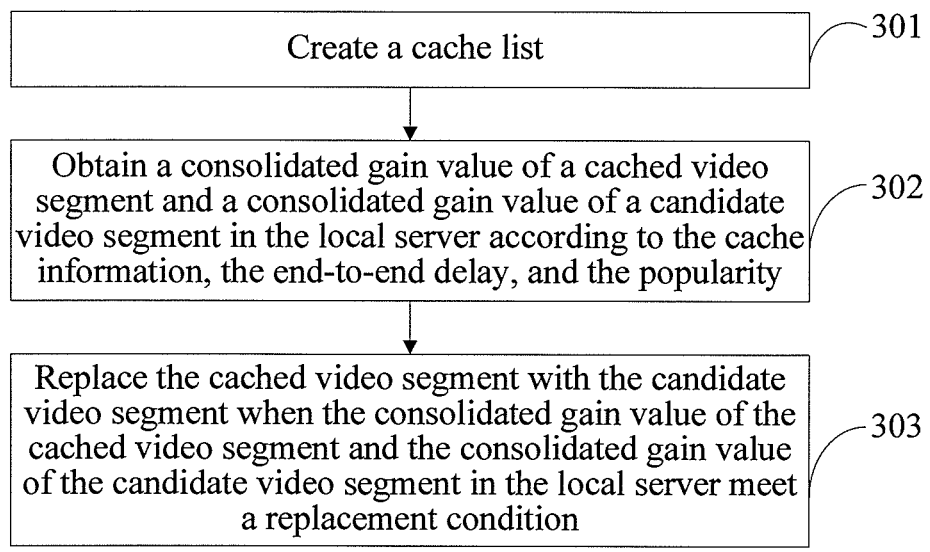
FIG. 3 is a first flow chart of a cooperative caching method according to another embodiment of the present invention.

As shown in FIG. 3, another embodiment of the present invention provides a cooperative caching method, including:

Step 301: Create a cache list.

Figure 4:
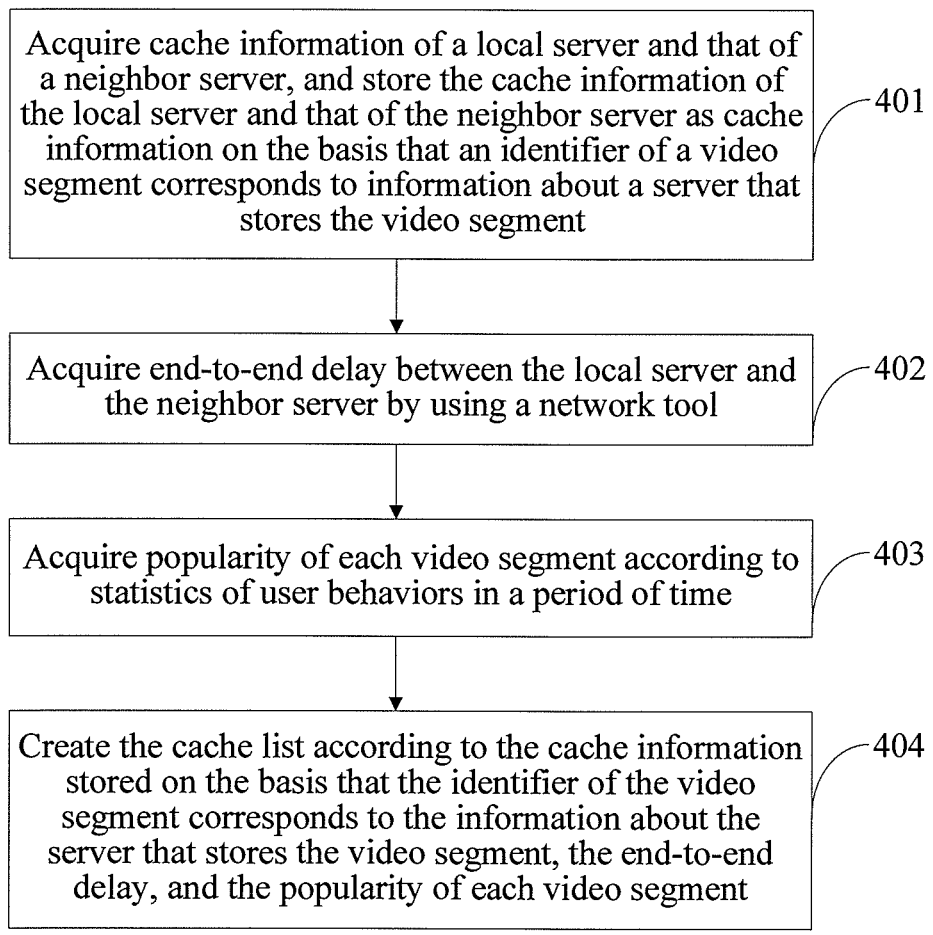
FIG. 4 is a flow chart of step 301 in the cooperative caching method shown in FIG. 3.

In this embodiment, as shown in FIG. 4, step 301 includes the following steps:

Step 401: Acquire cache information of a local server and that of a neighbor server, and store the cache information of the local server and that of the neighbor server as cache information on the basis that an identifier of a video segment corresponds to information about a server that stores the video segment.

In this embodiment, when a system starts, the system includes a local server and a neighbor server of the local server. The local server may first create a cache list including cache information of the local server, and then search for the neighbor server by using some common methods for searching for a neighbor server, for example, by using a distributed Hash table (Distributed Hash Table, DHT), by using a central server, or by using a central server in a peer-to-peer (Peer-to-Peer, P2P) mode. When the local server finds the neighbor server by using the preceding searching methods, the local server may send a cache information request to the neighbor server to obtain cache information of the neighbor server and store the acquired cache information into the cache list.

It should be noted that when the local server stores the cache information that is stored according to the cache information of the local server and that of the neighbor server, and the local server exchanges information with the neighbor server, the local server is capable of acquiring cache information of a neighbor server of the neighbor server, and the neighbor server is capable of acquiring information of a neighbor server of the local server.

Step 402: Acquire end-to-end delay between the local server and the neighbor server by using a network tool.

In this embodiment, step 402 is specifically as follows: acquire a PING value between the local server and the neighbor server by using a network tool PING. The PING value is used to indicate the end-to-end delay between the local server and the neighbor server.

The PING value between the local server and the neighbor server needs to be acquired periodically to ensure accuracy of the end-to-end delay.

It should be noted that the network tool is not limited to the network tool PING, and may also be another network tool, for example, Traceroute.

Step 403: Acquire popularity of each video segment according to statistics of user behaviors in a period of time.

Each server in the system may receive a large number of user requests. The popularity of each video segment may be obtained by collecting statistics of user behaviors in a period of time. A high popularity indicates a higher probability of requesting a video segment by a user.

In this embodiment, the method for calculating the popularity of the video segment includes, but is not limited to, that in a period of time, a total number of accesses to each video segment on a certain server is divided by a total number of accesses on the server to obtain popularity of each video segment on the server. It should be noted that the accuracy of collecting statistics of the popularity of each video segment based on a certain server is not high. Further, a total number of accesses to each video segment in a cooperative region or on servers in a whole network is divided by a total number of accesses in the cooperative region or on the servers in the whole network to obtain the popularity of each video segment. The cooperative region may be divided out and obtained according to a network topology or a geographical region where a server is located.

Certainly, it should be noted that the method for dividing out the cooperative region is not limited to the preceding two types, and the cooperative region may also be divided out and obtained according to a preset division rule. No further description is provided here.

Alternatively, the popularity of the video segment may also be obtained by using a Zipf (Zipf) distribution method.

Step 404: Create the cache list according to the cache information stored on the basis that the identifier of the video segment corresponds to the information about the server that stores the video segment, the end-to-end delay, and the popularity of each video segment. In this embodiment, the cache list may be shown in Table 1.

TABLE 1

Cache list created on a local server A

| Identifier of a Video Segment | Information about a Server | Popularity | End-to-End Delay |
|---|---|---|---|
| Video segment 1 | Server A | $\lambda_{A1}$ | $d_{A1A}$ |
|  | Server B | $\lambda_{B1}$ | $d_{B1A}$ |
|  | Server D | $\lambda_{D1}$ | $d_{D1A}$ |
| Video segment 2 | Server A | $\lambda_{A2}$ | $d_{A2A}$ |
|  | Server C | $\lambda_{C2}$ | $d_{C2A}$ |
|  | Server D | $\lambda_{D2}$ | $d_{D2A}$ |
|  | Server E | $\lambda_{E2}$ | $d_{E2A}$ |
| Video segment 3 | Server B | $\lambda_{B3}$ | $d_{B3A}$ |
| ... | ... | ... | ... |
| Video segment n | Server B | $\lambda_{Bn}$ | $d_{BnA}$ |
|  | Server F | $\lambda_{Fn}$ | $d_{FnA}$ |
|  | Server G | $\lambda_{Gn}$ | $d_{GnA}$ |
|  | Server H | $\lambda_{Hn}$ | $d_{HnA}$ |

In Table 1, n video segments and information about servers corresponding to the video segments exist in the cache list created on the server A. In the table, statistics of popularity are collected based on the server. According to the preceding methods for collecting statistics of the popularity, the statistics of the popularity may also be collected based on the cooperative region. For example, when the statistics collection is performed based on the cooperative region, the server A, the server B, and the server D in Table 1 are put into a cooperative region. In this case, the popularity of the video segment 1 should be the same on the server A, the server B, and the server D, that is, $\lambda_{A1}=\lambda_{B1}=\lambda_{D1}$. In addition, the end-to-end delay in Table 1 is end-to-end delay between the local server A and its neighbor server, and may be indicated by a PING value. The end-to-end delay in the table is indicated by a formula $d_{kji}=d(k,i)$, indicating end-to-end delay from a server i to a server k. This value may be obtained by using PING between the server k and the server i, where j indicates an identifier of a video segment that the server i needs to acquire from the server k. It should be noted that $d_{iji}=d(i,i)=0$.

To avoid unnecessary delay as much as possible when a local user acquires a video segment, the information about a server includes not only an identifier of the server, but also a utility value. The utility value is a probability of acquiring, by the local server when receiving a video segment request of the local user, a video segment that is stored in the server corresponding to the identifier of the server. A higher utility value leads to a higher probability of acquiring, by the local server, the video segment that is stored in the server corresponding to the identifier of the server. Specifically:

(a) When a video segment requested by the local user does not exist in the local server, the utility value is a reciprocal of end-to-end delay from the local server to a neighbor server that stores the video segment requested by the local user. $E_{ij}$ indicates a set of servers that store a video segment j in the cache list of the server i, and for each server, $k \in E_{ij}$. The information about a server also stores a utility value indicated by $U_{ijk}$ in addition to an ID value of the server. $d_{ijk}$ indicates delay generated when the server i accesses the video segment j in the server k. Here, the utility value is defined as a function of access delay:

$$U_{ijk} = \begin{cases} 1/d_{ijk}, & k \text{ caches } j \text{ whereas } i \text{ does not cache } j \\ 0, & \text{Other situations} \end{cases}$$

Here, $d_{ijk}=d(i,k)$, indicating the end-to-end delay from the server k to the server i. This value may be obtained by using PING between the server and the server k.

(b) When the video segment requested by the local user exists in the local server, the utility value is infinite.

Step 302: Obtain a consolidated gain value of a cached video segment and a consolidated gain value of a candidate video segment in the local server according to the cache information, the end-to-end delay, and the popularity.

To facilitate understanding of a person skilled in the art, assume that the server i is the local server, and the server i caches the video segment j. Here, the video segment j is the cached video segment, and a video segment t also exists, which is a video segment that may replace the video segment j and is not cached into the server i. The video segment t is the candidate video segment. In addition, the neighbor server k of the server i does not cache the video segment j or the video segment t. The following describes four situations for analysis.

(1) When the server i caches the video segment j, the local user may acquire the video segment j from the server i, and therefore the average delay is 0. Here, a local connection between the server i and the local user is not a bottleneck; therefore, the local delay from the server i to the local user is ignored. Users requesting the video segment j from the neighbor server k of the server i may request the video segment j from the server i through the server k (that is, in this situation, $i \in E_{kj}$, $E_{kj}$ indicating a set of servers that store the video segment j in the cache list of the server k), and may also request the video segment j from another neighbor server of the neighbor server k. The average delay of acquiring the video segment j by a user on the neighbor server k is $\overline{d}_{kj}=\Sigma_{i \in E_{kj}}P_{kji}d_{kji}$, where $$P_{kji} = \frac{U_{kji}}{\sum_{q \in E_{kj}} U_{kjq}}$$

and $$U_{kji} = \begin{cases} 1/d_{kji}, & i \text{ caches } j \text{ whereas } k \text{ does not cache } j \\ 0, & \text{Other situations} \end{cases}$$

Here, $d_{kji}=d(k,i)$, indicating the end-to-end delay from the server i to the server k, and this value may be obtained by using PING between the server k and the server i. Taking the popularity of the video segment j into consideration, weighted average delay of acquiring the video segment j by all users requiring the video segment j on the neighbor server k is $\lambda_{kj}\bar{d}_{kj}$.

(2) When the server i does not cache the video segment j (that is, the video segment j is replaced with the video segment t), the users requesting the video segment j from the server i are capable of requesting the video segment j only from a neighbor server of the server i through the server i. The average delay of acquiring the video segment j by the local user on the server i is $\bar{d}_{ij}^*$ (here, the * symbol indicates post replacement). The specific method for obtaining $\bar{d}_{ij}^*$ is the same as the implementation method of $\bar{d}_{kj}$, which is not described here. Taking the popularity of the video segment j into consideration, weighted average delay of acquiring the video segment j by all users requiring the video segment j on the server i is $\lambda_{ij}\bar{d}_{ij}^*$. The users requesting the video segment j from the neighbor server k of the server cannot request the video segment j from the server i through the server k (because the video segment j has been replaced by the server i, that is, in this situation, $i \notin E_{kj}$, $E_{kj}$ indicating the set of servers that store the video segment j in the cache list of the server k), and are capable of requesting the video segment j only from another neighbor server of the server k. In this case, the weighted average delay of acquiring the video segment j by all users requiring the video segment j on the server k is $\lambda_{kj}\bar{d}_{kj}^*$.

(3) When the server i caches the video segment t (that is, the video segment t replaces the video segment j), users requesting the video segment t from the server i may locally acquire the video segment t, and therefore the average delay is 0. Users requesting the video segment t from the neighbor server k of the server i may request the video segment t from the server i through the server k (that is, in this situation, $i \in E_{kt}$, $E_{kt}$ indicating a set of servers that store the video segment t in the cache list of the server k), and may also request the video segment t from another neighbor server of the server k. In this case, weighted average delay of acquiring the video segment t by all users requiring the video segment t on the server k is $\lambda_{kt}\bar{d}_{kt}^*$. The implementation method of the average delay is the same as that of the average delay of the video segment j, which is not described here.

(4) When the server i does not cache the video segment t, the users requesting the video segment t from the server i may request the video segment t only from a neighbor server of the server i through the server i. Therefore, weighted average delay of acquiring the video segment t by all users requiring the video segment t on the server is $\lambda_{it}\bar{d}_{it}$. The users requesting the video segment t from the neighbor server k of the server i cannot request the video segment t from the server i through the server k (because the server i does not store the video segment t, that is, in this situation, $i \notin E_{kt}$), and may request the segment t only from another neighbor server of the server k. In this case, the weighted average delay of acquiring the video segment t by all users requiring the video segment t on the server k is $\lambda_{kt}\bar{d}_{kt}$. The implementation method of the average delay is the same as that of the average delay of the video segment j, which is not described here.

Table 2 lists the weighted average delay of acquiring the video segments j and t by the local user of the server i and the neighbor server of the server i respectively in the preceding four situations.

TABLE 2

Weighted average delay of acquiring the video segments j and t by the local user of the server i and the neighbor server of the server i respectively

| | Weighted Average Delay | |
|---|---|---|
| i Caches or not | Local User | Neighbor Server |
| the server i caches the video segment j | 0 | $\lambda_{kj}\bar{d}_{kj}$ |
| and does not cache the video segment t | $\lambda_{it}\bar{d}_{it}$ | $\lambda_{kt}\bar{d}_{kt}$ |
| the server i caches the video segment t | 0 | $\lambda_{kt}\bar{d}_{kt}^*$ |
| and does not cache the video segment j | $\lambda_{ij}\bar{d}_{ij}^*$ | $\lambda_{kj}\bar{d}_{kj}^*$ |

For the server i, assume that the gain (that is, reduced average delay) brought for the local user by replacing the video segment j with the video segment t is indicated by $G_{ii}(j,t)$, where $$G_{ii}(j,t) = (0 + \lambda_{it}\bar{d}_{it}) - (\lambda_{ij}\bar{d}_{ij}^* + 0)$$
$$= (0 - \lambda_{ij}\bar{d}_{ij}^*) + (\lambda_{it}\bar{d}_{it} - 0).$$

For the neighbor server k of the server i, after the server i replaces the video segment j with the video segment t, assume that the gain (that is, reduced average delay) brought by the replacement for the server k is indicated by $G_{ik}(j,t)$, where $$G_{ik}(j,t) = (\lambda_{kj}\bar{d}_{kj} + \lambda_{kt}\bar{d}_{kt}) - (\lambda_{kj}\bar{d}_{kj}^* + \lambda_{kt}\bar{d}_{kt}^*)$$
$$= (\lambda_{kj}\bar{d}_{kj} - \lambda_{kj}\bar{d}_{kj}^*) + (\lambda_{kt}\bar{d}_{kt} - \lambda_{kt}\bar{d}_{kt}^*).$$

In this case, for a local region $L_i$ with the server i as its center, the server i replaces the video segment j with the video segment t. The consolidated gain value of the video segment j is a weighted sum of a gain value of the neighbor server and that of the user, and is indicated by a formula $$\frac{\sum_{k \in L_i \backslash i} D_k(\lambda_{kj}\bar{d}_{kj} - \lambda_{kj}\bar{d}_{kj}^*) + D_i(0 - \lambda_{ij}\bar{d}_{ij}^*)}{\sum_{k \in L_i} D_k},$$

where $\lambda_{kj}$ is popularity of the cached video segment j on the neighbor server k;

$\bar{d}_{kj}$ is average delay of acquiring the cached video segment j by the server k;

$\bar{d}_{kj}^*$ is average delay of acquiring the cached video segment j by the server k after the cached video j is replaced with the candidate video segment t;

$\lambda_{kj}\bar{d}_{kj} - \lambda_{kj}\bar{d}_{kj}^*$ indicates the gain value of the neighbor server k, the server k requesting a gain value of the cached video segment j when the cached video segment j on the local server i is replaced;

$\lambda_{ij}$ is popularity of the cached video segment j on the local server i;

$\bar{d}_{ij}^*$ is average delay of acquiring the cached video segment j by the local server i after the cached video j is replaced with the candidate video segment t;

$0-\lambda_{ij}\bar{d}_{ij}^*$ indicates the gain value of the user, the local user requesting a gain value of the cached video segment j when the cached video segment j on the local server i is replaced;

$L_i$ indicates a local region with the local server i as its center, the local region including the local server i and the set $\{k\}$ of neighbor servers of the local server i;

$D_k$ indicates a sum of bit rates of streaming media generated by all users served by the server k; and $D_i$ indicates a sum of bit rates of streaming media generated by all users served by the local server i.

The consolidated gain value of the video segment t is a weighted sum of the gain value of the neighbor server and that of the user, and is indicated by a formula $$\frac{\sum_{k \in L_i \setminus i} D_k(\lambda_{kt}\bar{d}_{kt} - \lambda_{kt}\bar{d}_{kt}^*) + D_i(\lambda_{it}\bar{d}_{it} - 0)}{\sum_{k \in L_i} D_k},$$

where $\lambda_{kt}$ is popularity of the candidate video segment t on the neighbor server k;

$\bar{d}_{kt}$ is average delay of acquiring the candidate video segment t by the server k;

$\bar{d}_{kt}^*$ average delay of acquiring the candidate video segment t by the server k after the cached video j is replaced with the candidate video segment t;

$\lambda_{kt}\bar{d}_{kt}-\lambda_{kt}\bar{d}_{kt}^*$ indicates the gain value of the neighbor server, the server k requesting a gain value of the candidate video segment t when the cached video segment j on the local server i is replaced with the candidate video segment t;

$\lambda_{it}$ is popularity of the cached video segment t on the local server i;

$\bar{d}_{it}$ is average delay of acquiring the candidate video segment t by the local server i before the cached video j is replaced with the candidate video segment t;

$\lambda_{it}\bar{d}_{it}-0$ indicates the gain value of the user, the local user requesting a gain value of the cached video segment t when the cached video segment j on the local server i is replaced with the candidate video segment t;

$L_i$ indicates a local region with the local server i as its center, the local region including the local server i and the set $\{k\}$ of neighbor servers of the local server i;

$D_k$ indicates a sum of bit rates of streaming media generated by all users served by the server k; and $D_i$ indicates a sum of bit rates of streaming media generated by all users served by the local server i.

Step 303: Replace the cached video segment with the candidate video segment when the consolidated gain value of the cached video segment and the consolidated gain value of the candidate video segment in the local server meet a replacement condition.

Figure 5:
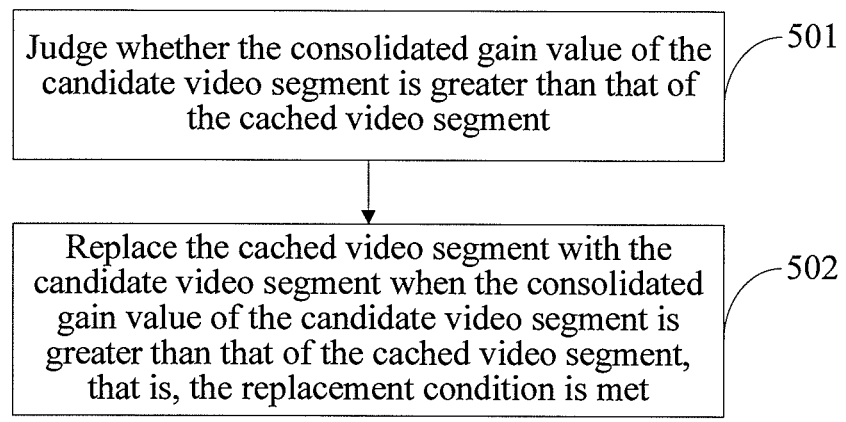
FIG. 5 is a first flow chart of step 303 in the cooperative caching method shown in FIG. 3.

As shown in FIG. 5, step 303 includes the following steps:

Step 501: Judge whether the consolidated gain value of the candidate video segment is greater than that of the cached video segment.

Step 502: Replace the cached video segment with the candidate video segment when the consolidated gain value of the candidate video segment is greater than that of the cached video segment, that is, the replacement condition is met.

Figure 6:
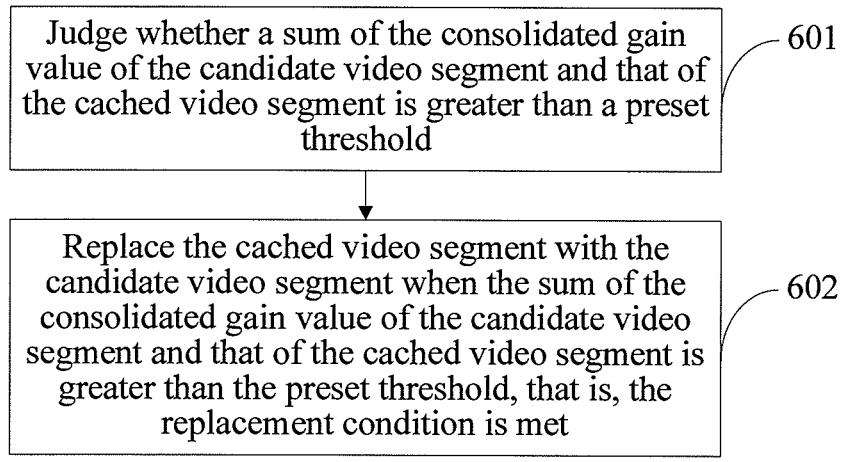
FIG. 6 is a second flow chart of step 303 in the cooperative caching method shown in FIG. 3.

Preferably, as shown in FIG. 6, to avoid network instability caused by frequent replacement, step 303 includes the following steps:

Step 601: Judge whether a sum of the consolidated gain value of the candidate video segment and that of the cached video segment is greater than a preset threshold.

In this embodiment, the preset threshold may be $\alpha \bar{d}_{L_i}$, and preferably, $\alpha > 1$. Assuming that a set of neighbor servers of the server is $N_i$, the local region $L_i$ of the server i includes the server i itself and all its neighbor servers $N_i$. Therefore, average access delay of the local region $L_i$ may be indicated by $$\bar{d}_{L_i} = \frac{\sum_{k \in L_i} D_k \bar{d}_k}{\sum_{k \in L_i} D_k},$$

where $D_k$ indicates a sum of bit rates of streaming media generated by all users served by the server k and the unit is bit/s.

Step 602: Replace the cached video segment with the candidate video segment when the sum of the consolidated gain value of the candidate video segment and that of the cached video segment is greater than the preset threshold, that is, the replacement condition is met.

Figure 7:
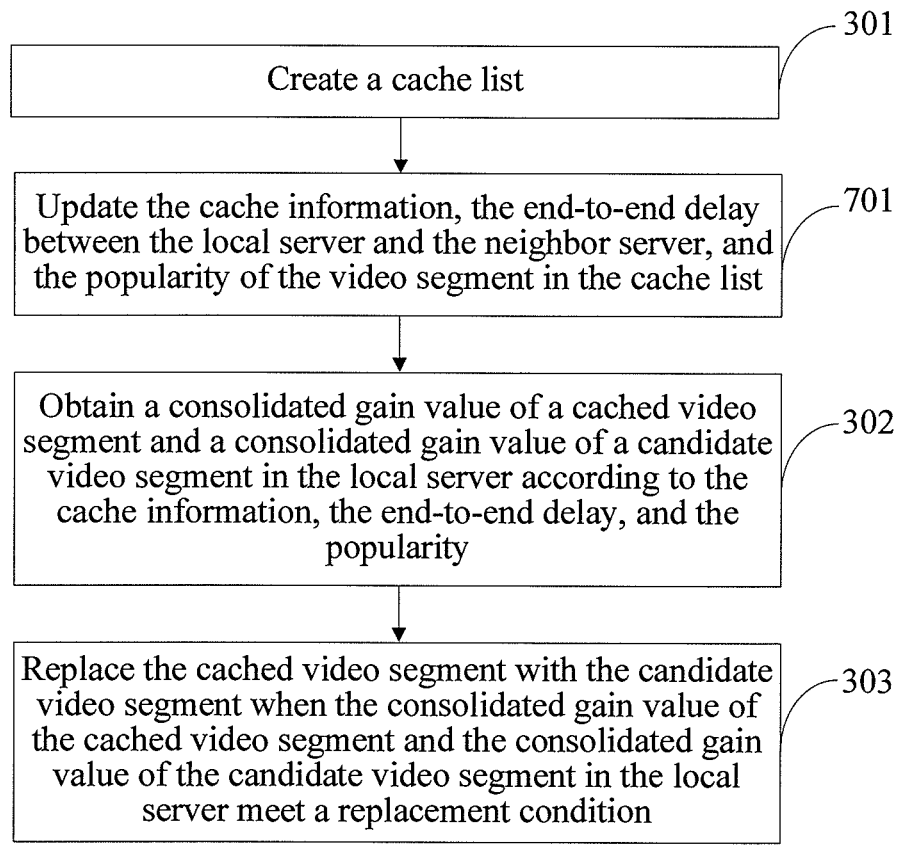
FIG. 7 is a second flow chart of a cooperative caching method according to another embodiment of the present invention.

Preferably, to ensure accuracy of the cache information, the end-to-end delay between the local server and the neighbor server, and the popularity that are stored in the cache list, as shown in FIG. 7, after step 301, the cooperative caching method further includes:

Step 701: Update the cache information, the end-to-end delay between the local server and the neighbor server, and the popularity of the video segment in the cache list.

The update of the cache information may be implemented by periodically acquiring the cache information of the local server and that of the neighbor server; the end-to-end delay between the local server and the neighbor server may be periodically acquired by using a network tool; and statistics of the popularity may be collected by periodically selecting user behaviors in a period of time.

The update of the cache information may also be triggered by a preset update condition. When the cache list meets the trigger condition, the cache list is updated. Certainly, the methods for updating the cache list are not limited to the preceding methods and are not described in further detail here.

According to the cooperative caching method provided in this embodiment, whether the cached video segment needs to be replaced with the candidate video segment is determined by judging whether the consolidated gain value of the cached video segment and the consolidated gain value of the candidate video segment in the local server that are obtained according to the cache information, the end-to-end delay, and the popularity meet the replacement condition. When the consolidated gain value of the cached video segment and the consolidated gain value of the candidate video segment in the local server meet the replacement condition, the cached video segment is replaced with the candidate video segment, which is capable of improving the local hit ratio of a local user without increasing the local server costs.

Figure 8:
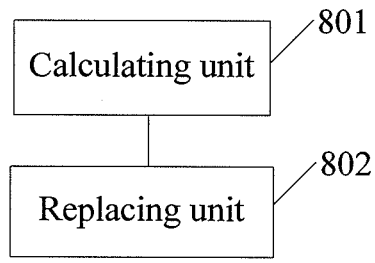
FIG. 8 is a first schematic structural diagram of a cooperative caching apparatus according to an embodiment of the present invention.

As shown in FIG. 8, an embodiment of the present invention provides a cooperative caching apparatus, including a calculating unit 801 and a replacing unit 802.

The calculating unit 801 is configured to obtain, according to cache information, end-to-end delay between a local server and a neighbor server, and popularity of a video segment in a cache list, a consolidated gain value of a cached video segment and a consolidated gain value of a candidate video segment in the local server, where the cache information includes an identifier of a video segment and information about a server that stores the video segment, and the information about the server includes an identifier of the server. For the specific implementation method, reference may be made to step 201 illustrated in FIG. 2, and no further description is provided here.

The replacing unit 802 is configured to replace the cached video segment with the candidate video segment when the consolidated gain value of the cached video segment and the consolidated gain value of the candidate video segment in the local server that are calculated and obtained by the calculating unit meet a replacement condition. For the specific implementation method, reference may be made to step 202 illustrated in FIG. 2, and no further description is provided here.

Figure 9:
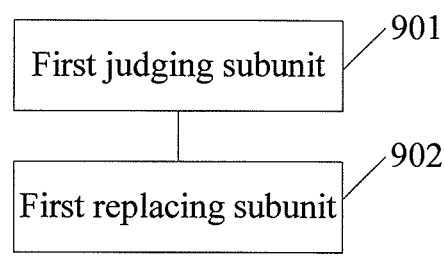
FIG. 9 is a first schematic structural diagram of a replacing unit in the cooperative caching apparatus shown in FIG. 8.

In this embodiment, as shown in FIG. 9, the replacing unit includes a first judging subunit 901 and a first replacing subunit 902.

The first judging subunit 901 is configured to judge whether the consolidated gain value of the candidate video segment is greater than that of the cached video segment, where the consolidated gain value of the candidate video segment and that of the cached video segment are calculated and obtained by the calculating unit. For the specific implementation method, reference may be made to step 501 illustrated in FIG. 5, and no further description is provided here.

The first replacing subunit 902 is configured to replace the cached video segment with the candidate video segment when the first judging subunit determines that the consolidated gain value of the candidate video segment is greater than that of the cached video segment. For the specific implementation method, reference may be made to step 502 illustrated in FIG. 5, and no further description is provided here.

Figure 10:
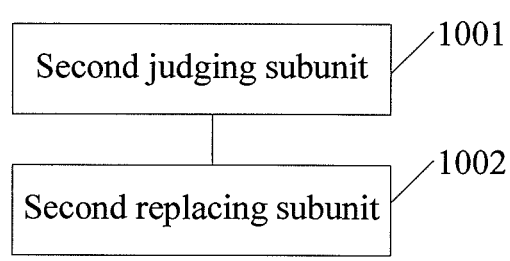
FIG. 10 is a second schematic structural diagram of the replacing unit in the cooperative caching apparatus shown in FIG. 8.

Preferably, to avoid network instability caused by frequent replacement, as shown in FIG. 10, the replacing unit includes a second judging subunit 1001 and a second replacing subunit 1002.

The second judging subunit 1001 is configured to judge whether a sum of the consolidated gain value of the candidate video segment and that of the cached video segment is greater than a preset threshold, where the consolidated gain value of the candidate video segment and that of the cached video segment are calculated and obtained by the calculating unit. For the specific implementation method, reference may be made to step 601 illustrated in FIG. 6, and no further description is provided here.

The second replacing subunit 1002 is configured to replace the cached video segment with the candidate video segment when the second judging subunit determines that the sum of the consolidated gain value of the candidate video segment and that of the cached video segment is greater than the preset threshold. For the specific implementation method, reference may be made to step 602 illustrated in FIG. 6, and no further description is provided here.

Figure 11:
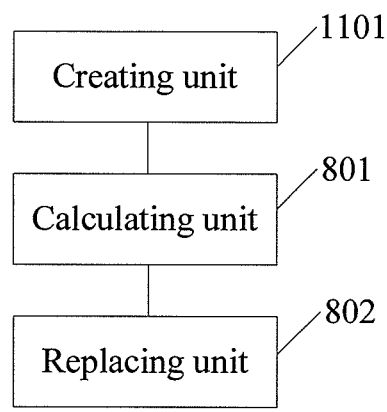
FIG. 11 is a second schematic structural diagram of the cooperative caching apparatus according to an embodiment of the present invention.

Further, as shown in FIG. 11, the cooperative caching apparatus further includes:

a creating unit 1101, configured to create the cache list, where the cache list includes the cache information, the end-to-end delay between the local server and the neighbor server, and the popularity of the video segment. For the specific implementation method, reference may be made to step 301 illustrated in FIG. 3, and no further description is provided here.

Figure 12:
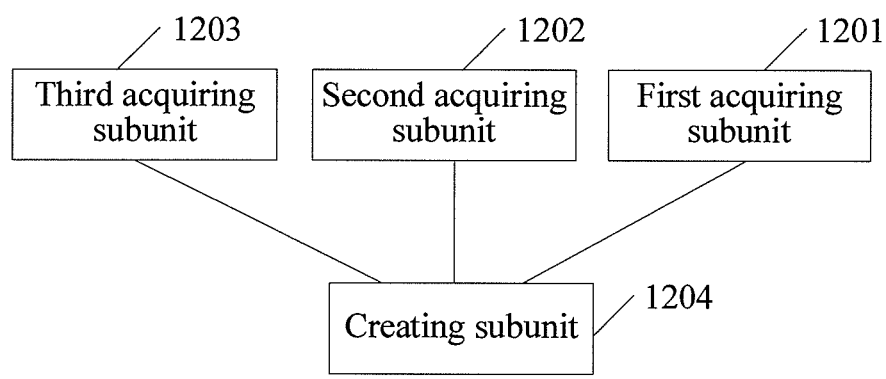
FIG. 12 is a schematic structural diagram of a creating unit in the cooperative caching apparatus shown in FIG. 11.

In this embodiment, as shown in FIG. 12, the creating unit includes a first acquiring subunit 1201, a second acquiring subunit 1202, a third acquiring subunit 1203, and a creating subunit 1204.

The first acquiring subunit 1201 is configured to acquire cache information of the local server and that of the neighbor server, and store the cache information of the local server and that of the neighbor server as cache information based on a video segment and information about a server that stores the video segment. For the specific implementation method, reference may be made to step 401 illustrated in FIG. 4, and no further description is provided here.

The second acquiring subunit 1202 is configured to acquire the end-to-end delay between the local server and the neighbor server by using a network tool. In this embodiment, the second acquiring subunit includes a first acquiring module, configured to acquire the end-to-end delay between the local server and the neighbor server by using a network tool PING. For the specific implementation method, reference may be made to step 402 illustrated in FIG. 4, and no further description is provided here.

The third acquiring subunit 1203 is configured to acquire popularity of each video segment according to statistics of user behaviors in a period of time.

Figure 13:
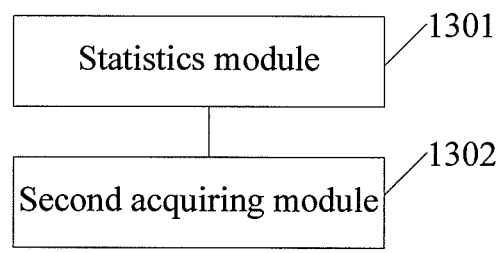
FIG. 13 is a schematic structural diagram of a third acquiring subunit of the creating unit in the cooperative caching apparatus shown in FIG. 11.

In this embodiment, as shown in FIG. 13, the third acquiring subunit includes a statistics module 1301 and a second acquiring module 1302.

The statistics module 1301 is configured to divide a total number of accesses to each video segment in a cooperative region or on servers in a whole network by a total number of accesses in the cooperative region or on the servers in the whole network to obtain the popularity of each video segment.

The second acquiring module 1302 is configured to acquire the popularity of each video segment obtained by the statistics module.

For the specific implementation method, reference may be made to step 403 illustrated in FIG. 4, and no further description is provided here.

The creating subunit 1204 is configured to create the cache list according to the cache information that is acquired by the first acquiring subunit and stored based on the video segment and the information about the server that stores the video segment, the end-to-end delay acquired by the second acquiring subunit, and the popularity of each video segment acquired by the third acquiring subunit. For the specific implementation method, reference may be made to step 404 illustrated in FIG. 4, and no further description is provided here.

Figure 14:
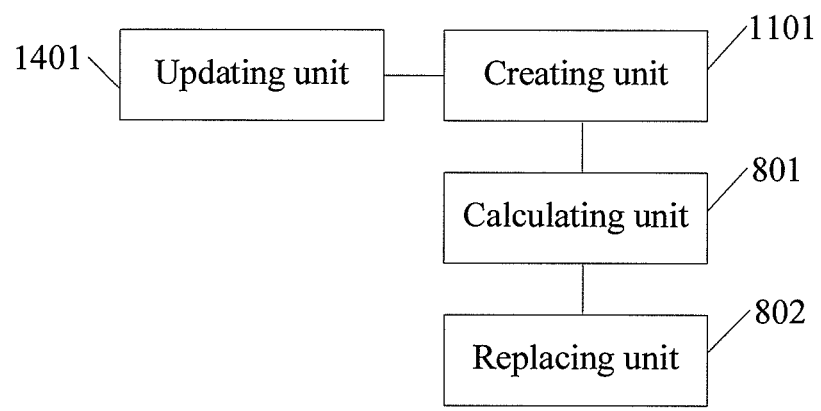
FIG. 14 is a third schematic structural diagram of the cooperative caching apparatus according to an embodiment of the present invention.

Further, as shown in FIG. 14, the cooperative caching apparatus further includes:

an updating unit 1401, configured to update the cache information, the end-to-end delay between the local server and the neighbor server, and the popularity of the video segment in the cache list created by the creating unit. For the specific implementation method, reference may be made to step 701 illustrated in FIG. 7, and no further description is provided here.

According to the cooperative caching apparatus provided in this embodiment, whether the cached video segment needs to be replaced with the candidate video segment is determined by judging whether the consolidated gain value of the cached video segment and the consolidated gain value of the candidate video segment in the local server that are obtained according to the cache information, the end-to-end delay, and the popularity meet the replacement condition. When the consolidated gain value of the cached video segment and the consolidated gain value of the candidate video segment in the local server meet the replacement condition, the cached video segment is replaced with the candidate video segment, which is capable of improving the local hit ratio of a local user without increasing the local server costs.

The cooperative caching method and apparatus provided in the embodiments of the present invention may be applied to various network topologies, for example, a tree topology and a mesh topology.

A person of ordinary skill in the art should understand that all or a part of the steps of the methods in the embodiments may be implemented by a program instructing relevant hardware. The program may be stored in a computer readable storage medium, such as a ROM/RAM, a magnetic disk, or an optical disk.

The above description is merely exemplary embodiments of the present invention, and is not intended to limit the protection scope of the present invention. Various modifications and replacements that can be easily thought of by a person skilled in the art without departing from the technical scope of the present invention should be considered falling within the protection scope of the present invention. Therefore, the protection scope of the present invention falls in the appended claims.

What is claimed is:

1. A cooperative caching method, comprising:
    obtaining, according to cache information, end-to-end delay between a local server and a neighbor server, and popularity of a video segment in a cache list, a consolidated gain value of a cached video segment and a consolidated gain value of a candidate video segment in the local server, wherein the cache information comprises an identifier of a video segment and information about a server that stores the video segment, and the information about the server comprises an identifier of the server and a utility value, wherein the utility value is a probability of acquiring, by the local server when receiving a video segment request of a local user, a video segment that is stored in the server corresponding to the identifier of the server, and the utility value is obtained according to the end-to-end delay from the local server to the neighbor server, wherein when a video segment requested by the local user does not exist in the local server, the utility value is a reciprocal of end-to-end delay from the local server to a neighbor server that stores the video segment requested by the local user; and
    when the video segment requested by the local user exists in the local server, the utility value is infinite; and
    replacing the cached video segment with the candidate video segment when the consolidated gain value of the cached video segment and the consolidated gain value of the candidate video segment in the local server meet a replacement condition.

2. The method according to claim 1, further comprising:
    creating the cache list, wherein the cache list comprises the cache information, the end-to-end delay between the local server and the neighbor server, and the popularity of the video segment.

3. The method according to claim 2, wherein creating the cache list comprises:
    acquiring cache information of the local server and that of the neighbor server, and storing the cache information of the local server and that of the neighbor server as cache information on the basis that an identifier of a video segment corresponds to information about a server that stores the video segment;
    acquiring the end-to-end delay between the local server and the neighbor server by using a network tool;
    acquiring popularity of each video segment according to statistics of user behaviors in a period of time; and
    creating the cache list according to the cache information stored on the basis that the identifier of the video segment corresponds to the information about the server that stores the video segment, the end-to-end delay, and the popularity of each video segment.

4. The method according to claim 3, wherein acquiring the end-to-end delay between the local server and the neighbor server by using the network tool comprises:
    acquiring the end-to-end delay between the local server and the neighbor server by using a network tool PING.

5. The method according to claim 3, wherein acquiring the popularity of each video segment according to the statistics of user behaviors in the period of time comprises:
    dividing a total number of accesses to each video segment in a cooperative region or on servers in a whole network by a total number of accesses in the cooperative region or on the servers in the whole network to obtain the popularity of each video segment.

6. The method according to claim 2, further comprising:
    updating the cache information, the end-to-end delay between the local server and the neighbor server, and the popularity of the video segment in the cache list.

7. The method according to claim 1, wherein
    when a server k is a neighbor server of a local server i, the local server i stores a cached video segment j, and a candidate video segment t exists,
    the consolidated gain value of the cached video segment obtained according to the cache information, the end-to-end delay, and the popularity is a weighted sum of a gain value of the neighbor server and that of the user, and is indicated by a formula $$\frac{\sum_{k \in L_i \setminus i} D_k(\lambda_{kj}\overline{d}_{kj} - \lambda_{kj}\overline{d}_{kj}^*) + D_i(0 - \lambda_{ij}\overline{d}_{ij}^*)}{\sum_{k \in L_i} D_k},$$

where
$\lambda_{kj}$ is popularity of the cached video segment j on the neighbor server k;
$\overline{d}_{kj}$ is average delay of acquiring the cached video segment j by the server k;
$\overline{d}_{kj}^*$ is average delay of acquiring the cached video segment j by the server k after the cached video j is replaced with the candidate video segment t;
$\lambda_{kj}\overline{d}_{kj} - \lambda_{kj}\overline{d}_{kj}^*$ indicates the gain value of the neighbor server k, the server k requesting a gain value of the cached video segment j when the cached video segment j on the local server i is replaced;
$\lambda_{ij}$ is popularity of the cached video segment j on the local server i;

$\overline{d}_{ij}^*$ is average delay of acquiring the cached video segment j by the local server i after the cached video j is replaced with the candidate video segment t;

$0-\lambda_{ij}\overline{d}^*_{ij}$ indicates the gain value of the user, the local user requesting a gain value of the cached video segment j when the cached video segment j on the local server i is replaced;

$L_i$ indicates a local region with the local server i as its center, the local region comprising the local server i and the set {k} of neighbor servers of the local server i;

$D_k$ indicates a sum of bit rates of streaming media generated by all users served by the server k; and $D_i$ indicates a sum of bit rates of streaming media generated by all users served by the local server i; and the consolidated gain value of the candidate video segment obtained according to the cache information, the end-to-end delay, and the popularity is a weighted sum of a gain value of the neighbor server and that of the user, and is indicated by a formula $$\frac{\sum_{k \in L_i \setminus i} D_k(\lambda_{kt}\overline{d}_{kt} - \lambda_{kt}\overline{d}^*_{kt}) + D_i(\lambda_{it}\overline{d}_{it} - 0)}{\sum_{k \in L_i} D_k},$$

where $\lambda_{kt}$ is popularity of the candidate video segment t on the neighbor server k;

$\overline{d}_{kt}$ is average delay of acquiring the candidate video segment t by the server k;

$\overline{d}^*_{kt}$ is average delay of acquiring the candidate video segment t by the server k after the cached video j is replaced with the candidate video segment t;

$\lambda_{kt}\overline{d}_{kt} - \lambda_{kt}\overline{d}_{kt}^*$ indicates the gain value of the neighbor server k, the server k requesting a gain value of the candidate video segment t when the cached video segment j on the local server i is replaced with the candidate video segment t;

$\lambda_{it}$ is popularity of the cached video segment t on the local server i;

$\overline{d}_{it}$ is average delay of acquiring the candidate video segment t by the local server i before the cached video j is replaced with the candidate video segment t;

$\lambda_{it}\overline{d}_{it}-0$ indicates the gain value of the user, the local user requesting a gain value of the cached video segment t when the cached video segment j on the local server i is replaced with the candidate video segment t;

$L_i$ indicates a local region with the local server i as its center, the local region comprising the local server i and the set {k} of neighbor servers of the local server i;

$D_k$ indicates a sum of bit rates of streaming media generated by all users served by the server k; and $D_i$ indicates a sum of bit rates of streaming media generated by all users served by the local server i.

8. The method according to claim 1, wherein replacing the cached video segment with the candidate video segment when the consolidated gain value of the cached video segment and the consolidated gain value of the candidate video segment in the local server meet the replacement condition comprises:

judging whether the consolidated gain value of the candidate video segment is greater than that of the cached video segment; and replacing the cached video segment with the candidate video segment when the consolidated gain value of the candidate video segment is greater than that of the cached video segment, that is, the replacement condition is met.

9. The method according to claim 1, wherein replacing the cached video segment with the candidate video segment when the consolidated gain value of the cached video segment and the consolidated gain value of the candidate video segment in the local server meet the replacement condition comprises:

judging whether a sum of the consolidated gain value of the candidate video segment and that of the cached video segment is greater than a preset threshold; and replacing the cached video segment with the candidate video segment when the sum of the consolidated gain value of the candidate video segment and that of the cached video segment is greater than the preset threshold, that is, the replacement condition is met.

10. A device, comprising:

a memory configured to store instructions; and a processor coupled to the memory to execute the instructions to:

obtain, according to cache information, end-to-end delay between a local server and a neighbor server, and popularity of a video segment in a cache list, a consolidated gain value of a cached video segment and a consolidated gain value of a candidate video segment in the local server, wherein the cache information comprises an identifier of a video segment and information about a server that stores the video segment, and the information about the server comprises an identifier of the server and a utility value, wherein the utility value is a probability of acquiring, by the local server when receiving a video segment request of a local user, a video segment that is stored in the server corresponding to the identifier of the server, and the utility value is obtained according to the end-to-end delay from the local server to the neighbor server, when a video segment requested by the local user does not exist in the local server, the utility value is a reciprocal of end-to-end delay from the local server to a neighbor server that stores the video segment requested by the local user; and replace the cached video segment with the candidate video segment when the consolidated gain value of the cached video segment and the consolidated gain value of the candidate video segment in the local server meet a replacement condition.

11. The device according to claim 10, the processor is further configured to:

create the cache list, wherein the cache list comprises the cache information, the end-to-end delay between the local server and the neighbor server, and the popularity of the video segment.

12. The device according to claim 10, wherein when creating the cache list, the processor is further configured to:

acquire cache information of the local server and that of the neighbor server, and store the cache information of the local server and that of the neighbor server as cache information on the basis that an identifier of a video segment corresponds to information about a server that stores the video segment;

acquire the end-to-end delay between the local server and the neighbor server by using a network tool;

acquire popularity of each video segment according to statistics of user behaviors in a period of time; and create the cache list according to the cache information stored on the basis that the identifier of the video segment corresponds to the information about the server that stores the video segment, the end-to-end delay, and the popularity of each video segment.

13. The device according to claim 10, wherein when acquiring the end-to-end delay between the local server and the neighbor server by using the network tool, the processor is further configured to:
acquire the end-to-end delay between the local server and the neighbor server by using a network tool PING.

14. The device according to claim 10, wherein when acquire the popularity of each video segment according to the statistics of user behaviors in the period of time, the processor is further configured to:
divide a total number of accesses to each video segment in a cooperative region or on servers in a whole network by a total number of accesses in the cooperative region or on the servers in the whole network to obtain the popularity of each video segment.

15. The device according to claim 10, the processor is further configured to:
update the cache information, the end-to-end delay between the local server and the neighbor server, and the popularity of the video segment in the cache list.

16. The device according to claim 10, wherein when a server k is a neighbor server of a local server i, the local server i stores a cached video segment j, and a candidate video segment t exists,
the consolidated gain value of the cached video segment obtained according to the cache information, the end-to-end delay, and the popularity is a weighted sum of a gain value of the neighbor server and that of the user, and is indicated by a formula $$\frac{\sum_{k \in L_i \backslash i} D_k(\lambda_{kj}\overline{d}_{kj} - \lambda_{kj}\overline{d}_{kj}^*) + D_i(0 - \lambda_{ij}\overline{d}_{ij}^*)}{\sum_{k \in L_i} D_k},$$

where is popularity of the cached video segment j on the neighbor server k;
$\lambda_{kj}$ is average delay of acquiring the cached video segment j by the server k;
$\overline{d}_{kj}^*$ is average delay of acquiring the cached video segment j by the server k;
$\overline{d}_{kj}$ is average delay of acquiring the cached video segment j by the server k after the cached video j is replaced with the candidate video segment t;
$\lambda_{kj}\overline{d}_{kj}-\lambda_{kj}\overline{d}_{kj}^*$ indicates the gain value of the neighbor server k, the server k requesting a gain value of the cached video segment j when the cached video segment j on the local server i is replaced;
$\lambda_{ij}$ is popularity of the cached video segment j on the local server i;
$\overline{d}_{ij}^*$ is average delay of acquiring the cached video segment j by the local server i after the cached video j is replaced with the candidate video segment t;
$0-\lambda_{ij}\overline{d}_{ij}^*$ indicates the gain value of the user, the local user requesting a gain value of the cached video segment j when the cached video segment j on the local server i is replaced;
$L_i$ indicates a local region with the local server i as its center, the local region comprising the local server i and the set {k} of neighbor servers of the local server i;
$D_k$ indicates a sum of bit rates of streaming media generated by all users served by the server k; and $D_i$ indicates a sum of bit rates of streaming media generated by all users served by the local server i; and
the consolidated gain value of the candidate video segment obtained according to the cache information, the end-to-end delay, and the popularity is a weighted sum of a gain value of the neighbor server and that of the user, and is indicated by a formula $$\frac{\sum_{k \in L_i \backslash i} D_k(\lambda_{kt}\overline{d}_{kt} - \lambda_{kt}\overline{d}_{kt}^*) + D_i(\lambda_{it}\overline{d}_{it} - 0)}{\sum_{k \in L_i} D_k},$$

where
$\lambda_{kt}$ is popularity of the candidate video segment t on the neighbor server k;
$\overline{d}_{kt}$ is average delay of acquiring the candidate video segment t by the server k;
$\overline{d}_{kt}^*$ is average delay of acquiring the candidate video segment t by the server k after the cached video j is replaced with the candidate video segment t;
$\lambda_{kt}\overline{d}_{kt}-\lambda_{kt}\overline{d}_{kt}^*$ indicates the gain value of the neighbor server k, the server k requesting a gain value of the candidate video segment t when the cached video segment j on the local server i is replaced with the candidate video segment t;
$\lambda_{it}$ is popularity of the cached video segment t on the local server i;
$\overline{d}_{it}$ is average delay of acquiring the candidate video segment t by the local server i before the cached video j is replaced with the candidate video segment t;
$\lambda_{it}\overline{d}_{it}-0$ indicates the gain value of the user, the local user requesting a gain value of the cached video segment t when the cached video segment j on the local server i is replaced with the candidate video segment t;
$L_i$ indicates a local region with the local server i as its center, the local region comprising the local server i and the set {k } of neighbor servers of the local server i;
$D_k$ indicates a sum of bit rates of streaming media generated by all users served by the server k; and
$D_i$ indicates a sum of bit rates of streaming media generated by all users served by the local server i.

17. The device according to claim 10, wherein when replacing the cached video segment with the candidate video segment when the consolidated gain value of the cached video segment and the consolidated gain value of the candidate video segment in the local server meet the replacement condition, the processor is further configured to:
judge whether the consolidated gain value of the candidate video segment is greater than that of the cached video segment; and
replace the cached video segment with the candidate video segment when the consolidated gain value of the candidate video segment is greater than that of the cached video segment, that is, the replacement condition is met.

18. The device according to claim 10, wherein when replacing the cached video segment with the candidate video segment when the consolidated gain value of the cached video segment and the consolidated gain value of the candidate video segment in the local server meet the replacement condition, the processor is further configured to:

judge whether a sum of the consolidated gain value of the candidate video segment and that of the cached video segment is greater than a preset threshold; and replace the cached video segment with the candidate video segment when the sum of the consolidated gain value of the candidate video segment and that of the cached video segment is greater than the preset threshold, that is, the replacement condition is met.

* * * * *